United States Patent
Jackson

(10) Patent No.: US 10,518,794 B2
(45) Date of Patent: Dec. 31, 2019

(54) HYDRATION CART

(71) Applicant: Jeffrey K. Jackson, Salt Lake City, UT (US)

(72) Inventor: Jeffrey K. Jackson, Salt Lake City, UT (US)

(*) Notice: Subject to any disclaimer, the term of this patent is extended or adjusted under 35 U.S.C. 154(b) by 0 days.

(21) Appl. No.: 16/027,061

(22) Filed: Jul. 3, 2018

(65) Prior Publication Data

US 2018/0312184 A1 Nov. 1, 2018

Related U.S. Application Data

(63) Continuation of application No. 15/632,344, filed on Jun. 24, 2017, now Pat. No. 10,029,721.

(60) Provisional application No. 62/354,114, filed on Jun. 24, 2016.

(51) Int. Cl.
*B62B 3/10* (2006.01)

(52) U.S. Cl.
CPC ............ *B62B 3/10* (2013.01); *B62B 2202/20* (2013.01); *B62B 2202/50* (2013.01); *B62B 2501/06* (2013.01)

(58) Field of Classification Search
CPC .............. B62B 3/10; B62B 3/002–004; B62B 2202/20; B62B 2202/40
See application file for complete search history.

(56) References Cited

U.S. PATENT DOCUMENTS

| | | | |
|---|---|---|---|
| 1,772,111 A | 8/1930 | Rice | |
| 1,979,549 A | 11/1934 | Huckel | |
| 3,232,489 A | 2/1966 | Buffington | |
| 3,677,173 A | 7/1972 | Fogle, Jr. | |
| 4,114,965 A * | 9/1978 | Oye | A47B 31/00 312/209 |
| 4,308,975 A | 1/1982 | Bowen | |
| 4,588,237 A * | 5/1986 | Marder | A61G 12/001 312/183 |
| 5,154,317 A | 10/1992 | Roppolo, III | |
| 5,626,353 A | 5/1997 | Campbell | |
| 6,047,866 A | 4/2000 | Brown | |
| 7,168,599 B1 | 1/2007 | Criswell et al. | |
| 7,757,908 B1 | 7/2010 | Buhl, Jr. | |
| 7,909,148 B1 | 3/2011 | Miller et al. | |
| D778,662 S | 2/2017 | Gannon | |
| 9,681,638 B1 | 6/2017 | Harris et al. | |
| 10,029,721 B2 | 7/2018 | Jackson | |
| 2002/0047251 A1 | 4/2002 | Simmons et al. | |
| 2005/0011037 A1 | 1/2005 | Zhao et al. | |

(Continued)

OTHER PUBLICATIONS

Powerade Sideline Cart Adjustable Height, Accessed Dec. 19, 2017, pp. 1-2.

(Continued)

*Primary Examiner* — Erez Gurari
(74) *Attorney, Agent, or Firm* — Warren M. Pate; Pate Peterson, PLLC

(57) ABSTRACT

A cart for the management of liquids, trash, and equipment during indoor events is disclosed. The cart may include a liquid container positioned above a top surface such that liquids spilled from the liquid container are contained on the top surface. The top surface may comprise an aperture extending therethrough. A trash container may be positioned below the aperture in the top surface to catch any liquid or trash that passes down through the aperture.

20 Claims, 4 Drawing Sheets

(56) References Cited

U.S. PATENT DOCUMENTS

| | | |
|---|---|---|
| 2006/0102231 A1 | 5/2006 | Schiller et al. |
| 2007/0182113 A1 | 8/2007 | McCutchen et al. |
| 2007/0182114 A1 | 8/2007 | Fernandes et al. |
| 2007/0267832 A1 | 11/2007 | Denissov |
| 2009/0309321 A1 | 12/2009 | Sukey et al. |
| 2011/0309591 A1 | 12/2011 | Petrick et al. |
| 2014/0375004 A1 | 12/2014 | Adams et al. |
| 2015/0166089 A1 | 6/2015 | Rupp |
| 2015/0344176 A1 | 12/2015 | Seibold |
| 2016/0121914 A1 | 5/2016 | Fodrocy et al. |
| 2016/0347598 A1 | 12/2016 | Gannon et al. |
| 2017/0327141 A1 | 11/2017 | Thuma et al. |
| 2017/0340105 A1 | 11/2017 | Knighton |

OTHER PUBLICATIONS

Gatorade Cooler Stand for 3,5,7 & 10 Gallon Cooler, Accessed Dec. 19, 2017, pp. 1-2.
Water Cooler Cart, Accessed Dec. 19, 2017, pp. 1-2.

* cited by examiner

HYDRATION CART

RELATED APPLICATIONS

This application is a continuation of U.S. patent application Ser. No. 15/632,344 filed Jun. 24, 2017, which claims the benefit of U.S. Provisional Patent Application Ser. No. 62/354,114 filed Jun. 24, 2016.

FIELD OF THE INVENTION

The present invention relates to a novel device for the management of liquids, trash and equipment during indoor events. More particularly, the invention relates to a device which contains and organizes liquids, trash, and equipment while preventing theft or spillage.

BACKGROUND

Indoor events are a staple of many popular sports. All indoor sporting events require hydration, specialized athletic equipment, and trash collection in support of the competing athletes. There are many ad hoc solutions for the management of liquids, trash, and sporting equipment, but there are no consolidated solutions which provide security, organization, and spill prevention in one package.

Athletic trainers currently utilize open sided carts for the dispensing of liquids. These carts sometimes possess a small shelf, below the liquid container, for the storage of equipment and or trash.

Current solutions do not contain design features for the retention of spilled liquid. They are also non-lockable and do not protect against disorganization or potential thefts from foreign parties.

Another drawback is that many current carts are too large for use in the tight confines of indoor sporting events. These size requirements pertain to height, for sightlines, and 360 degree access radius.

Therefore, a need exists in the field for novel consolidated devices and apparatuses capable of maneuvering in the confines of an indoor environment, containing spillage of liquids and trash, organizing and securing equipment, enabling easy mobility, and allowing for compatibility with common liquid and trash containers.

BRIEF SUMMARY OF THE INVENTION

The present invention comprises a novel utility cart for the management of liquids, trash, and equipment during indoor events. The utility cart may have a raised lip covering a portion of the enclosed top surface below the liquid dispensing device such that spilled liquids are contained. This enclosed top surface may also contain a slight slope; thereby directing said spilled liquid into an appropriate receptacle for storage and later clean up. The outside edge of the raised lip could also be covered with a protective material to serve as a bumper.

The enclosed top surface may have a form of pedestal, which would serve to retain and elevate common liquid containers to a height such that common cups, bottles, and containers could be placed appropriately for the dispensing of liquids. This pedestal can also be designed for modularity in that it can be adjusted for the height and diameter of various liquid containers as desired.

Below the enclosed top surface could reside a receptacle for the collection of liquids and trash directly in line with the low point of the enclosed surface and a hole through the enclosed surface. This receptacle could also reside on flanges, rails, slides, or hinges for easy removal for emptying.

The area below the enclosed surface could also have locking doors to create a secure area for storage of equipment. These doors could also split in the middle for a reduced swing radius in a confined environment. The doors could either swing around to adhere to the side of the cart, slide back in to a false wall divider, retract below like an upside down single or upside down roll top.

BRIEF DESCRIPTION OF THE DRAWINGS

Some embodiments of the present invention are illustrated as an example and are not limited by the figures of the accompanying drawings, in which like references may indicate similar elements in which.

DETAILED DESCRIPTION OF THE DRAWINGS

Figure 1:
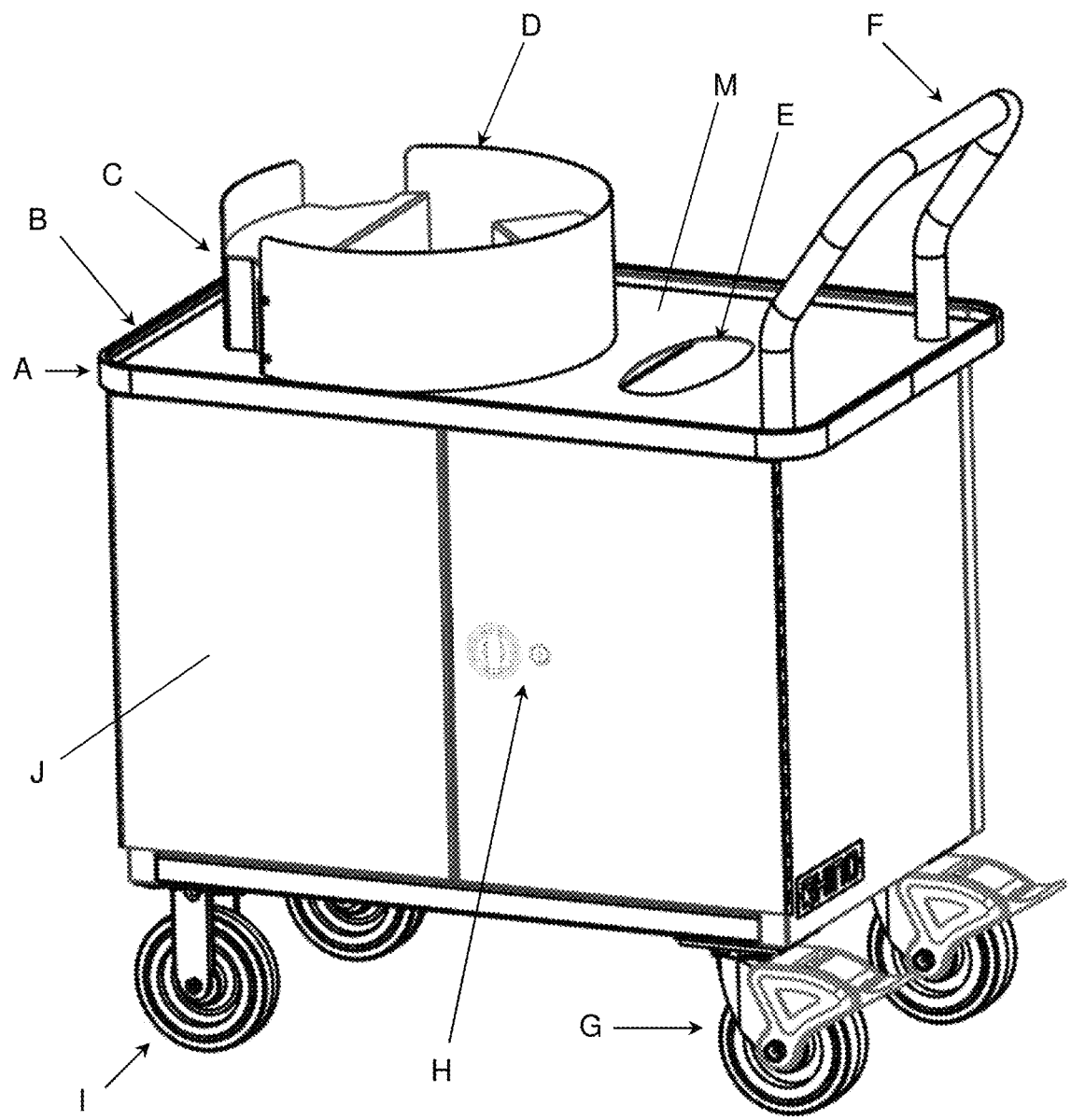
FIG. 1 shows a perspective view of the utility cart.

FIG. 1 shows a perspective view of the utility cart which demonstrates a potential placement for the:

A—Bumper;
B—Lip to prevent spillage;
C—Accommodation for the placement of common liquid containers;
D—Pedestal for the elevation of liquid dispensers above the enclosed top surface, which can be modular and allow for changes in orientation, pitch, and height for use with different bottles, cups and containers;
E—Hole at the low point of the inclined enclosed top surface for the collection of liquids and trash;
F—Handle for mobility and control;
G—360 degree swivel casters with brakes located below handle for increase mobility and control;
H—Locking device for the securing of one or multiple portions of the lower compartment;
I—Fixed fork wheels for controllability when turning, on inclines, and level surfaces at higher speed; and
J—Short radius doors for the securing of equipment and use in confined spaces.

Figure 2:
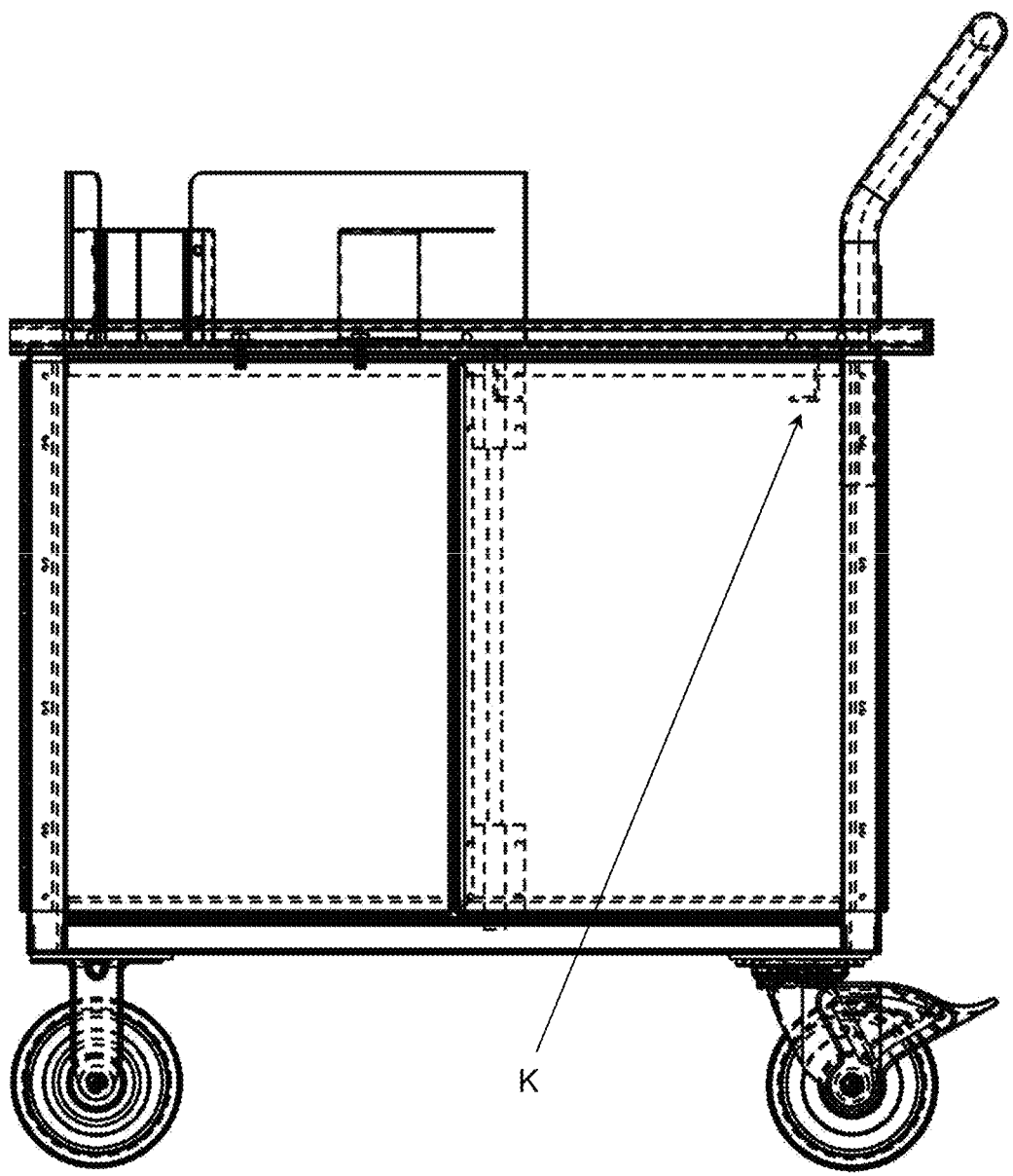
FIG. 2 shows a front view of the utility cart.

FIG. 2 shows a front view of the utility cart which demonstrates a potential placement for the flange, lip, or slide hinge (K) which enables easy removal and install of the trash and liquid receptacle placed under the hole at the low point of the inclined enclosed top surface.

Figure 3:
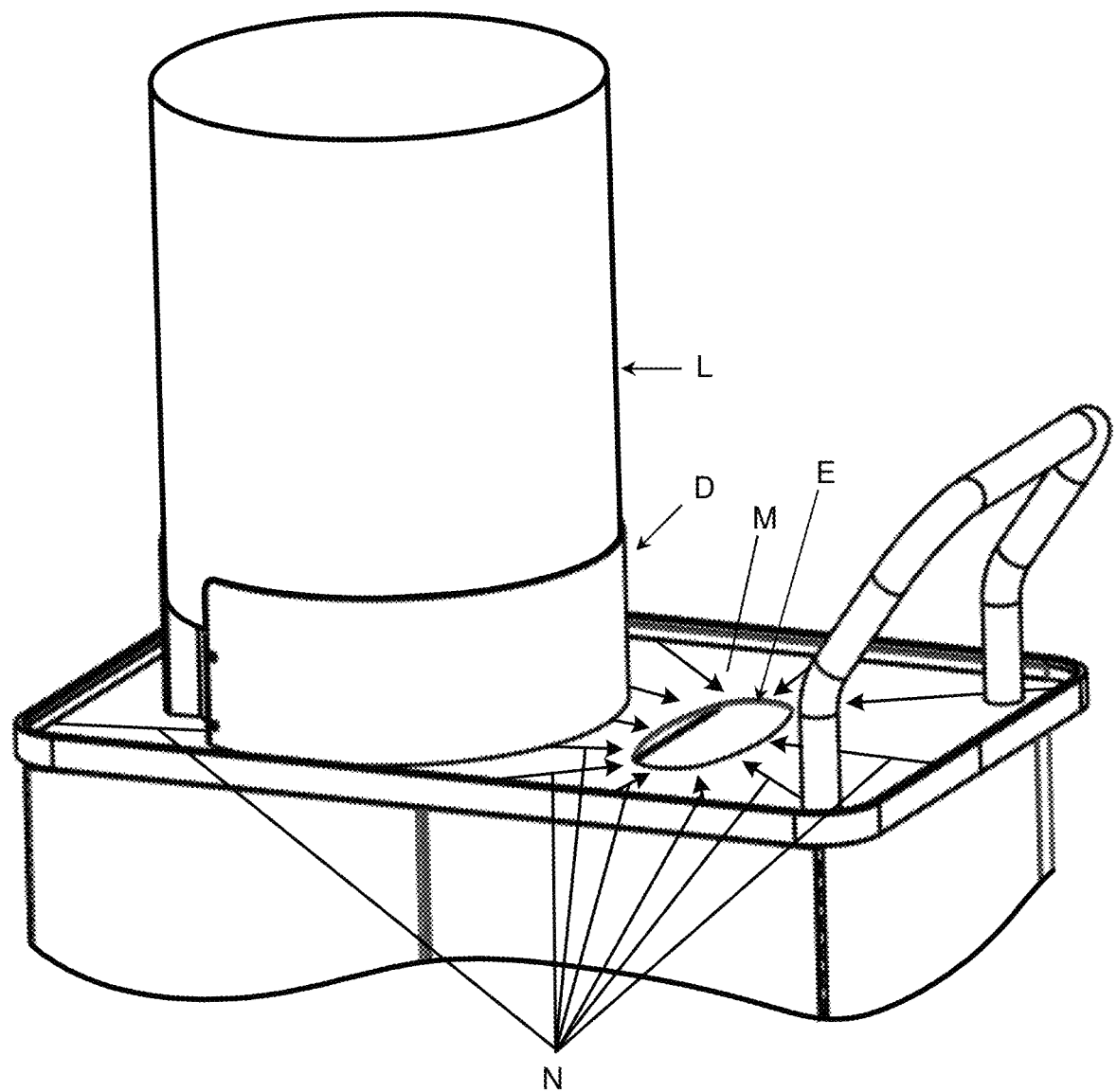
FIG. 3 shows a partial perspective view of the utility cart with a liquid container/dispenser elevated by the pedestal above the enclosed top surface.

FIG. 3 shows a partial perspective view of the utility cart with a liquid container/dispenser (L) elevated by the pedestal (D) above the enclosed top surface (M). FIG. 3 also shows the enclosed top surface (M) containing a slight slope (N). The hole (E) is at the low point of the inclined enclosed top surface (M).

Figure 4:
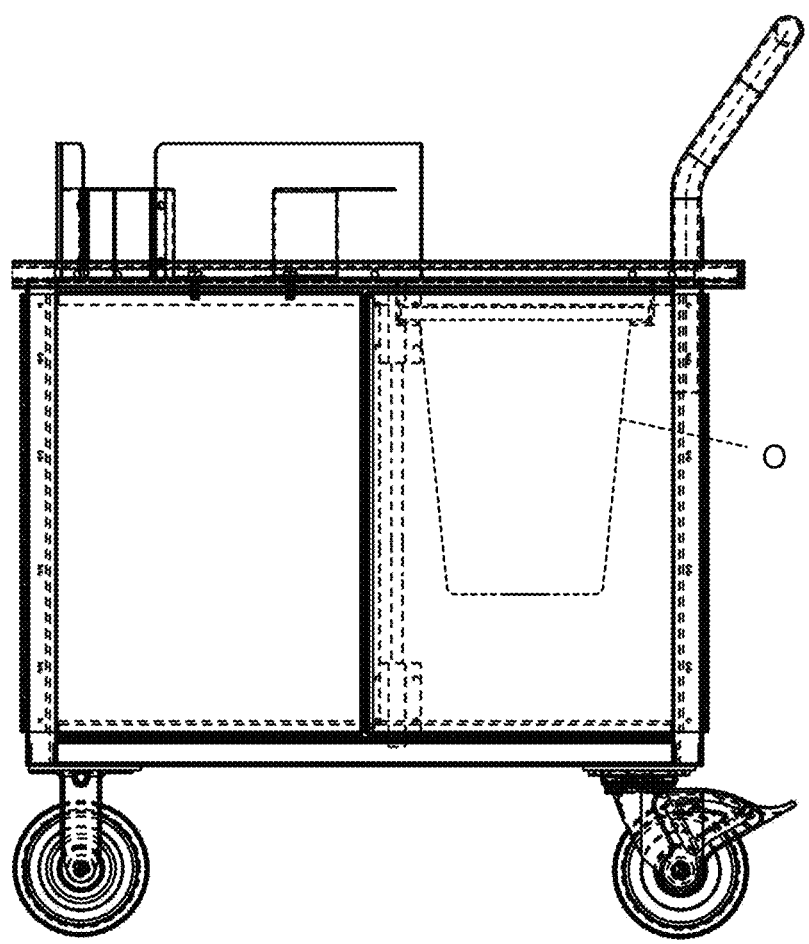
FIG. 4 shows a front view of the utility cart with a receptacle for collecting liquids and trash.

FIG. 4 shows a front view of the utility cart with a receptacle (O) for collecting liquids and trash. The receptacle (O) is placed under the hole (E). The receptacle (O) resides on flanges, rails, slides, or hinges (K) for easy removal for emptying.

A retention system for preventing spilled liquids from coming in contact with the floor may comprise: (a) a raised edge circumnavigating the top surface of the cart, the raised edge may be larger in width and length than the pedestal supporting the liquid dispenser; (b) a contoured or flat generally horizontal surface, with one or more holes for the liquid to drain through; (c) a retention device for holding a container in such a manner so as to catch spilled liquid passing through the hole in the contoured or flat surface; and (d) a raised edge circumnavigating the bottom surface of the cart, to act as a redundant retention device for any liquids passing through the previous members.

Any of the embodiments of the device can be formed or made out of plastic, metal, wood, or other material and may include both different shapes, forms, sizes or even advertising materials for brands and logos.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It is therefore contemplated that the claims will cover any such modifications or embodiments that fall within the true scope and spirit of the invention.

What is claimed is:

1. A hydration cart comprising:
   a frame;
   a plurality of wheels connected to the frame;
   a top surface connected to the frame;
   the top surface having an aperture extending therethrough;
   a pedestal extending above the top surface and comprising an interior support and an outer border, wherein the interior support is positioned a first distance above the top surface, the outer border has an upper extreme positioned a second distance above the top surface, the second distance is greater than the first distance, and the outer border has at least one gap formed therein such that the upper extreme of the outer border does not completely encircle the interior support;
   a multi-quart liquid container configured to dispense liquid, the liquid container resting on top of the interior support of the pedestal so as to be above the top surface;
   a trash container positioned below the top surface to catch matter falling through the aperture in the top surface.

2. The hydration cart of claim 1, wherein the liquid container rests on top of the interior support of the pedestal so as to be directly above the top surface.

3. The hydration cart of claim 2, wherein the pedestal rests on top of the top surface.

4. The hydration cart of claim 3, further comprising a raised lip circumnavigating the top surface.

5. The hydration cart of claim 4, wherein an outer edge of the raised lip is covered with a protective material forming a bumper for the hydration cart.

6. The hydration cart of claim 4, wherein the top surface slopes down to the aperture such that the aperture is the low point of the top surface.

7. The hydration cart of claim 3, wherein the frame comprises side walls, a bottom surface, and at least one door.

8. The hydration cart of claim 7, wherein the top surface, bottom surface, side walls, and at least one door combine to form an enclosed area.

9. The hydration cart of claim 8, further comprising a lock selectively locking the at least one door in a closed position.

10. The hydration cart of claim 1, wherein the top surface slopes down to the aperture such that the aperture is the low point of the top surface.

11. The hydration cart of claim 1, further comprising a raised lip circumnavigating the top surface.

12. A hydration cart comprising:
    an enclosure comprising a top surface;
    the enclosure wherein the top surface comprises an aperture extending through the top surface; and
    a plurality of wheels connected to the enclosure;
    a pedestal extending above the top surface and comprising an interior support and an outer border, wherein the interior support is positioned a first distance above the top surface, the outer border has an upper extreme positioned a second distance above the top surface, the second distance is greater than the first distance, and the outer border has at least one gap formed therein such that the upper extreme of the outer border does not completely encircle the interior support;
    a liquid container containing a potable liquid and configured to dispense the liquid, the liquid container resting on top of the interior support of the pedestal so as to be above the top surface; and
    a trash container positioned inside the enclosure to catch matter falling through the aperture in the top surface.

13. The hydration cart of claim 12, wherein the liquid container rests on top of the interior support of the pedestal so as to be directly above the top surface.

14. The hydration cart of claim 13, wherein the pedestal rests on top of the top surface.

15. The hydration cart of claim 12, wherein the top surface slopes down to the aperture such that the aperture is the low point of the top surface.

16. The hydration cart of claim 12, further comprising a raised lip circumnavigating the top surface.

17. The hydration cart of claim 12, wherein the top surface has an outer perimeter and the aperture is interior to and does not form part of the outer perimeter.

18. A method comprising:
    approaching a hydration cart comprising
        a top surface with an aperture extending therethrough,
        a pedestal extending above the top surface,
        a liquid container configured to dispense liquid,
        the liquid container resting on top of the pedestal so as to be above the top surface, and
        a trash container positioned below the aperture in the top surface;
    dispensing, from the liquid container while the liquid container is resting on top of the pedestal, a portion of liquid into a drinking vessel; and
    drinking, after the dispensing, the portion of liquid from the drinking vessel.

19. The method of claim 18, further comprising passing trash down through the aperture in the top surface and into the trash container.

20. The method of claim 19, wherein the top surface slopes down to the aperture such that the aperture is the low point of the top surface.

* * * * *